Oct. 28, 1947.  R. R. ROOT  2,429,773
DUSTING APPARATUS
Filed July 10, 1943  2 Sheets-Sheet 2

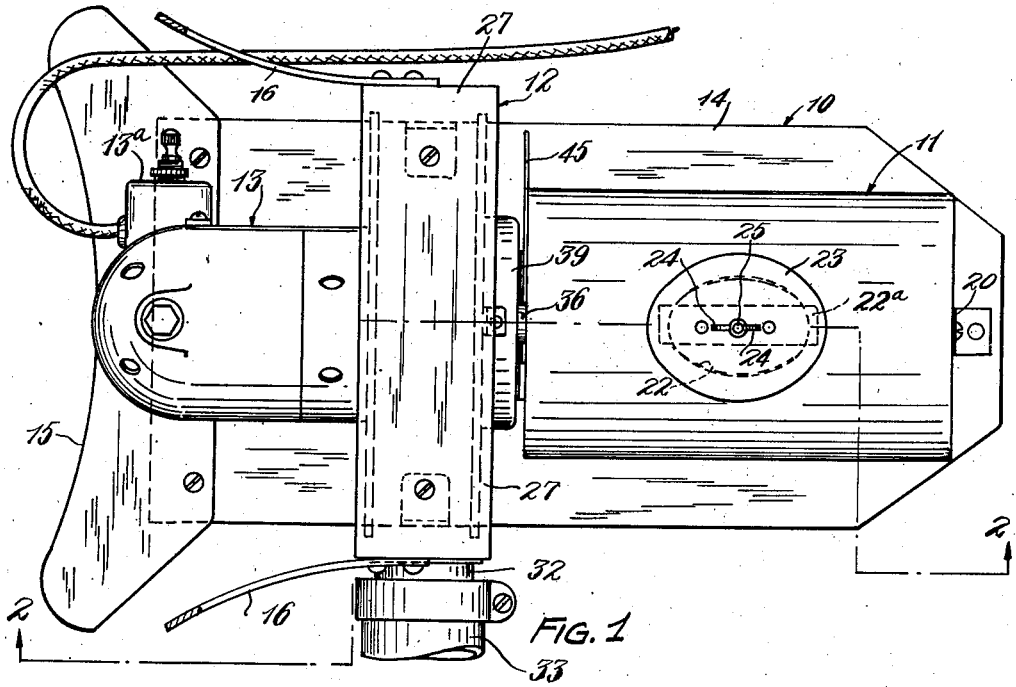

INVENTOR.
RALPH R. ROOT
BY
Kwis Hudson Boughton & Williams
ATTORNEYS

Patented Oct. 28, 1947

2,429,773

UNITED STATES PATENT OFFICE 2,429,773

DUSTING APPARATUS

Ralph R. Root, Lakewood, Ohio, assignor, by mesne assignments, to Naco Manufacturing Company, Huntington Park, Calif., a corporation of California Application July 10, 1943, Serial No. 494,152

3 Claims. (Cl. 43—148)

This invention relates to dusting apparatus for use in applying insecticide and/or fungicide dust to vegetation and aims to provide improved power driven apparatus of this kind which is simple, compact and of light weight and can be manually carried during use.

Another object of my invention is to provide an improved dusting apparatus having a dust container which is resiliently mounted and adapted to be rapidly vibrated for obtaining a positive feeding of dust therefrom.

A further object of my invention is to provide improved dusting apparatus, of the character mentioned, in which a power driven blower has a shaft extension adapted to impart vibratory movement to a resiliently mounted dust container for obtaining a positive feeding of dust from the container into an air stream created by the blower.

The invention may be further briefly summarized as consisting in certain novel combination and arrangements of parts hereinafter described and particularly set out in the appended claims.

In the accompanying sheets of drawings,

Fig. 1 is a plan view showing dusting apparatus embodying my invention;

Fig. 2 is a view of the apparatus taken substantially on line 2—2 of Fig. 1 and showing the same partly in section and partly in elevation;

Figure 3:
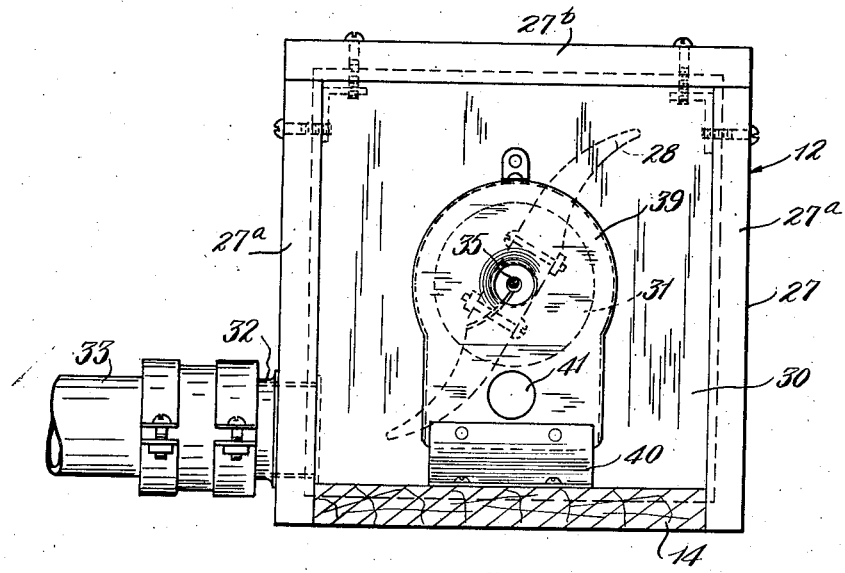
Fig. 3 is a transverse sectional view taken through the apparatus and looking toward the blower as indicated by line 3—3 of Fig. 2.
Figure 4:
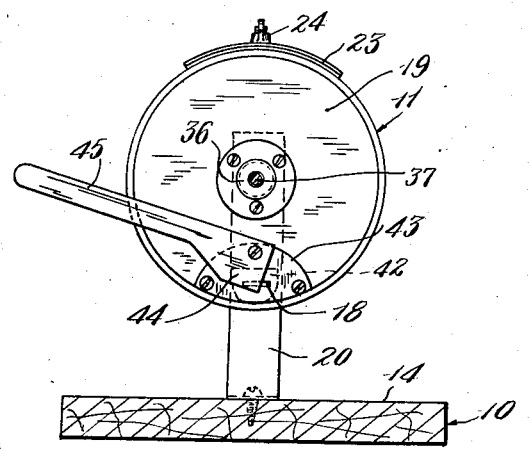
Fig. 4 is a partial transverse sectional view taken on line 4—4 of Fig. 2 and looking toward the dust hopper.
Figure 5:
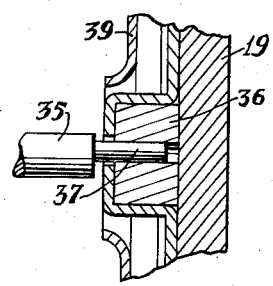
Fig. 5 is a sectional detail on an elongated scale showing the hopper vibrating means.

Proceeding now with a more detailed description of my dusting apparatus, I show the improved apparatus in the form of a manually portable unit although I do not wish to be limited in this respect because the invention can be embodied in other forms of dusters. The apparatus comprises in general a dust container or hopper 11, a blower 12 and a power device or motor 13 for driving the blower and vibrating the hopper. The support 10 may comprise a base 14 in the form of a board or elongated plate 14 having a recessed or concave part or portion 15 at one end thereof which is engageable with the trunk of the person carrying the duster. The support also includes a sling or shoulder strap 16 which is connected with the apparatus at a point spaced from the recessed body-engaging portion 15 and is of a length such that when it extends across the back or shoulders of the person or operator, the support 10 will extend substantially horizontally and in a direction forwardly of the trunk of such person.

The hopper 11 comprises an elongated container which in this instance is of circular cross section, although it may be of any desired shape, and which is adapted to contain a supply of insecticide or fungicide dust 17. At its inner end the hopper is provided with a dust delivery opening or slot 18 which extends through an upright side or end wall 19 of the hopper at a point adjacent the bottom thereof. The hopper 11 is resiliently mounted on the support 10 so that it can be rapidly vibrated to produce a positive feeding of the dust through the delivery opening 18. In mounting the hopper for such vibratory movement, I employ a resilient arm or bracket 20 having its ends connected respectively with the base 14 and the outer end or side wall 21 of the hopper and which arm is of a length to support the outer end of the hopper in spaced relation above the base. The member 20 thus forms a supporting and fulcrum means which is connected with a side or end of the hopper which is remote from the upright wall or end containing the delivery opening 18 and permits a vibratory swinging of the hopper which will cause the supply of dust 17 to be shifted or thrown toward the delivery opening and projected therethrough as a substantially continuous stream. The hopper may have a filling opening 22 in the top thereof through which the dust 17 may be introduced and which can be closed by a curved removable cover 23. The cover may include a locking bar 22a which is insertable through the opening 22 and retains the cover in place on the hopper when the wing nut 24 of the clamping screw 25 is tightened.

The blower 12 is located adjacent the inner end of the hopper 11 and may comprise a housing 27 and a fan 28 rotatable therein. The housing 27 may have a quadrangular frame comprising side and top strips 27a and 27b, preferably formed of wood or other appropriate non-metallic material and suitably connected with the support 10 so that the base 14 forms the bottom of the blower housing. Panels 29 and 30 of suitable non-metallic sheet material form the end walls of the blower housing. The end wall 30, which is nearest the hopper 11, has a central opening 31 therein through which air is drawn into the blower housing by the operation of the fan 28 therein. One of the side walls 27a of the blower housing 27 has a discharge tube 32 connected therewith and forming an air delivery outlet for the blower. A flexible conduit 33 is connected with the discharge outlet 32 and has a suitable nozzle 34 on its outer end for directing the dust-laden stream of air toward the vegetation to be treated.

For driving the fan 28 of the blower 12, I provide the power device 13 which, in this instance, is an electric motor having a control switch 13a although a small or fractional-horsepower internal combustion engine can be used if desired. The power device can be mounted directly on the base 14 although in this instance it is supported on the end wall 29 of the blower housing and has an axially projecting shaft 35 on which the fan 28 is mounted.

For imparting the rapid vibratory movement to the hopper 11, I extend the shaft 35 through the blower housing and provide the inner end of the hopper with a bearing 36 with which a reduced eccentric portion 37 of the shaft cooperates. Simultaneously with the operation of the blower 12, the shaft 35 imparts a rapid vibratory movement to the inner end of the hopper 11 which causes a substantially continuous stream of the dust 17 to be projected or squirted laterally through the opening 18 toward the housing of the blower, that is, in a direction substantially normal to the wall containing the opening.

The operation of the blower 12 causes a stream of air to flow past the opening 18 and into the blower housing through the opening 31 thereof. The dust stream being projected through the delivery opening 18 of the hopper is discharged into this air stream so that the discharged dust will be picked up by the air and will become thoroughly diffused or atomized to produce a dust laden stream for delivery through the nozzle 34.

For confining or directing the air entering the blower housing so that it will flow past the dust delivery opening 18 of the hopper, I provide a guard or baffle 39 on the end wall 30 of the blower housing in overlying relation to the air inlet opening 31. The baffle 39 is open at the bottom thereof so that the air stream into the blower will flow upwardlly between the blower housing and the inner end of the hopper. The baffle 39 may include a curved plate 40 at the lower end thereof which is connected with the base 14 and which facilitates the upward flow of air between the inner end of the hopper and blower housing. At a point opposite the discharge opening 18 of the hopper, the baffle 39 is provided with an opening 41 through which the discharged dust can be projected laterally into the upwardly flowing air stream.

Reverting to the hopper 11, I wish to point out that although the discharge opening 18 can be formed directly in the side or end wall 19 of the hopper, I prefer to construct this portion of the hopper so that a relatively small chamber 42 is provided at a point connecting the delivery opening 18 with the main chamber of the hopper. The opening 18 is preferably formed in a metal plate 43 which is attached to the inner end of the hopper and forms the outer wall of the chamber 42. It will be observed that the chamber 42 is in open communication with the main chamber of the hopper to receive dust therefrom and, being located adjacent the bottom of the hopper, it will normally be submerged, that is, lie below the surface of the body of dust 17 contained in the hopper. During the rapid vibration of the hopper 11, the dust 17 tends to move or flow toward the inner end and the small chamber 42 will always be maintained substantially full of dust and a substantially continuous stream of dust will be projected or discharged laterally through the opening 18 as long as the rapid vibration continues.

The delivery of dust through the opening 18 can be controlled by the starting and stopping of the power device 13 but, in addition to this, I provide a valve plate 44 which is movable across the opening 18 to uncover more or less thereof depending upon the rate of dust discharge desired. The valve plate 44 may be connected with, or carried by, a pivoted lever 45 by which the valve plate can be actuated or shifted. Although the valve plate 44 is usually kept in the closed position while the duster is not in operation, this is not entirely necessary because there is ordinarily no flow of dust through the opening 18 while the hopper is not being vibrated.

From the foregoing description and accompanying drawings it will now be readily understood that I have provided a simple and compact dusting apparatus in which a vibratory movement imparted to a resiliently mounted hopper is used in obtaining a positive feeding of the dust from the hopper to the air stream. It will also be seen that my dusting apparatus can readily be embodied in a light weight unit which is manually portable during use.

While I have illustrated and described my improved dusting apparatus in more or less detail, it will be understood of course that I do not wish to be limited to the particular construction and details herein disclosed, but regard my invention as including all changes and modification coming within the spirit of the invention and the scope of the appended claims.

Having thus described my invention I claim:

1. A dusting apparatus of the character described, comprising a support, an elongated substantially horizontally extending hopper spaced from said support and adapted to contain dust, a resilient member connecting one end of said hopper with said support, the other end of said hopper having a dust-delivery opening therein adjacent the bottom of the hopper and opening endwise thereof, a blower on said support operable to cause a stream of air to flow past said opening, said blower having an eccentric shaft portion engaging said other end of the hopper and acting to vibrate the hopper at a rate to cause dust to be projected from said opening into the air stream in the form of a substantially continuous dust stream.

2. A manually-portable power-operated dusting apparatus comprising a support having a recessed portion engageable with the trunk of the person carrying the apparatus and a carrying sling connected with the support at a point spaced from said recessed portion, said sling being of a length to retain said support in a substantially horizontally extending position while being manually carried, a hopper adapted to contain a supply of dust and having a delivery opening in a side wall thereof at a point adjacent the bottom of the hopper, resilient means mounting said hopper on said support for vibratory movement, a blower on the support operable to cause a stream of air to flow past said opening, and a motor for driving said blower and simultaneously vibrating said hopper to cause dust to be discharged from said opening into the air stream.

3. A dusting device comprising a support, a hopper adapted to contain a supply of dust, a supporting and fulcrum means connected with said hopper adjacent one side thereof and with said support so as to permit vibratory swinging movement of said hopper on said fulcrum means and relative to said support, said hopper having an upright wall at the side thereof opposite that connected to said fulcrum means and a delivery opening in said upright wall and adjacent the bottom of the hopper, a blower operable to cause a stream of air to flow past said delivery opening, and a single driving motor having a rotary shaft connected with said blower and with said hopper, the connection of said shaft with said hopper being adapted to impart to the latter said vibratory swinging movement so as to cause said dust supply to shift toward said delivery opening and be projected from said opening into said air stream in a direction substantially normal to said upright wall and in the form of a substantially continuous dust stream.

RALPH R. ROOT.

REFERENCES CITED

The following references are of record in the file of this patent:

UNITED STATES PATENTS

| Number | Name | Date |
|---|---|---|
| 1,576,076 | Walker | Mar. 9, 1926 |
| 2,098,034 | Flint | Nov. 21, 1937 |
| 2,103,400 | Weckerly | Dec. 28, 1937 |
| 448,853 | Corey | Mar. 24, 1891 |
| 2,157,630 | Root | May 9, 1939 |
| 967,266 | Thomas | Aug. 16, 1910 |
| 1,501,136 | Redmon | July 15, 1924 |
| 1,666,350 | Pitt | Apr. 17, 1928 |
| 539,102 | Turner | May 14, 1895 |
| 556,508 | Leggett | Mar. 17, 1896 |
| 2,246,497 | Beck | June 24, 1941 |

FOREIGN PATENTS

| Number | Country | Date |
|---|---|---|
| 351,873 | Germany | Apr. 15, 1922 |
| 199,441 | Great Britain | June 18, 1923 |